United States Patent [19]

Cappio et al.

[11] Patent Number: 4,661,698
[45] Date of Patent: Apr. 28, 1987

[54] ROTARY OPTICAL TRANSDUCER

[75] Inventors: Emilio C. Cappio, Biella; Giampaolo Guerrini, Ivrea, both of Italy

[73] Assignee: Ing. C. Olivetti & C., S.p.A., Ivrea, Italy

[21] Appl. No.: 678,994

[22] Filed: Dec. 6, 1984

[30] Foreign Application Priority Data

Dec. 7, 1983 [IT] Italy .............................. 68269 A/83

[51] Int. Cl.⁴ ............................................. G01D 5/34
[52] U.S. Cl. ........................ 250/231 SE; 250/237 G
[58] Field of Search ..................... 250/231 SE, 237 G;
340/347 P; 356/395

[56] References Cited

U.S. PATENT DOCUMENTS 4,342,909 8/1982 Accattino ..................... 250/231 SE Primary Examiner—Eugene R. LaRoche
Assistant Examiner—Steven J. Mottola
Attorney, Agent, or Firm—Banner, Birch, McKie & Beckett

[57] ABSTRACT

The optical transducer is connected to a rotary shaft (71) for detecting the angular position thereof and generates corresponding electrical signals. The transducer comprises a casing formed by two casing halves (11, 12) which can be assembled together by means of latch elements (62, 63). Mounted on a first casing half (11) are three phototransistors (31, 32) for detecting the light emitted by a diode (58) mounted on the other casing half (12). A shutter disc (64) which is provided with radial openings is mounted rotatably within the casing on the shaft (71) which is supported by a self-aligning bush (19) which is mounted on a casing half. A flexible printed circuit (38) is disposed within the first casing half, parallel to the shutter disc and is in contact with the three phototransistors. The printed circuit has a projecting portion (43) which is bent over inside the casing so as to contact the diode (58) and a projecting portion (39) which extends out of the casing to be connected to an external connector. In another embodiment the second casing half also has a self-aligning bush for the shaft.

13 Claims, 4 Drawing Figures

ROTARY OPTICAL TRANSDUCER

BACKGROUND OF THE INVENTION

1. Field of the Invention

The present invention relates to an optical transducer which can be connected to a rotary member for detecting the angular position thereof and generating corresponding electrical signals, comprising a support in which are mounted a light emitter and at least one light detector, and a shutter disc which can be connected to the rotary member and which is provided with a plurality of transparent radial elements which alternate with opaque radial elements capable of co-operating with the light emitter and light detctor for generation of the electrical signals.

2. Description of the Prior Art

A transducer is known, wherein the shutter disc is provided with a central hub. The disc and hub are housed with clearance within twocasing halves and, for precisely positioning the transducer with respect to the rotary member and in particular the shutter disc with respect to the light emitting and detecting elements, the arrangement has three separate positioning elements. A first element comprising an axial abutment which is fixed to the rotary member co-operates with the shutter disc to position it axially with respect to the rotary member; a second element which is provided directly on an outside wall of the casing axially positions same with respect to the rotary member; and a third element which is formed by a removable bush is used for radially positioning the casing with respect to the rotary member. While this known transducer has been found to be highly accurate and thus suitable for detecting even very small angular movements of the rotary member, it is fairly expensive both in regard to construction and assembly.

SUMMARY OF THE INVENTION

The object of the present invention is to provide an optical transducer which is very simple in design and wherein the connection thereof to the rotary memory is a simple operation and such as not to require the use of particular positioning elements.

The transducer according to the invention is characterised in that at least one self-aligning bush is mounted on the support and is capable of co-operating with the rotary member for holding the shutter disc interposed between the light detector and the light emitter, substantially orthogonal to the axis of the beam of light emitted by the light emitter.

The invention will be described in more detail by way of example with reference to the accompanying drawings.

DESCRIPTION OF THE PREFERRED EMBODIMENTS

Figure 1:
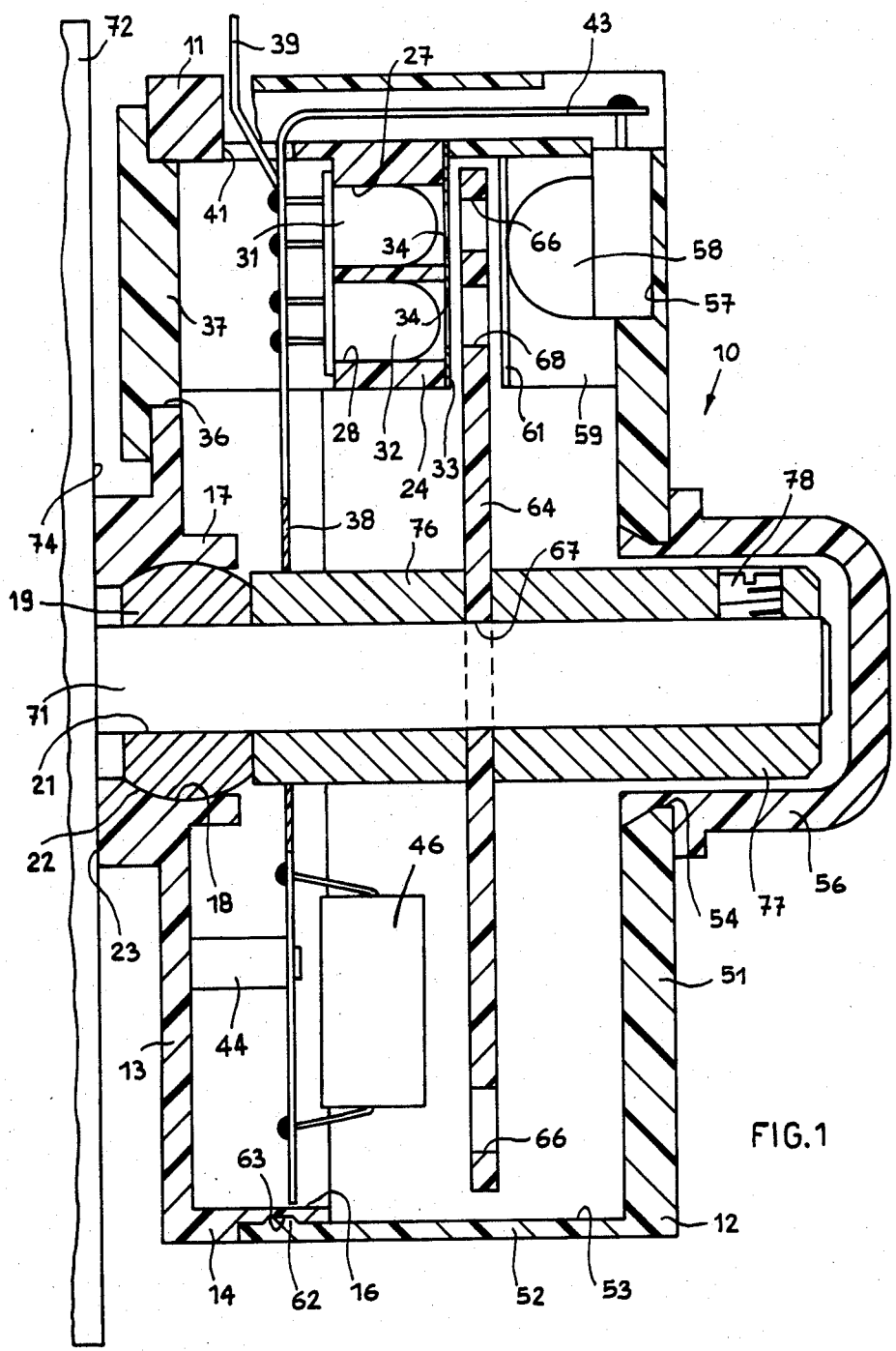
FIG. 1 is a sectional side view of a transducer according to the invention, in a first embodiment.

Referring to FIG. 1, an optical transducer 10 comprises a casing formed by a first casing half 11 and a second casing half 12 which are snapped together and which are made of opaque plastics material, such as for example a polycarbonate.

Figure 2:
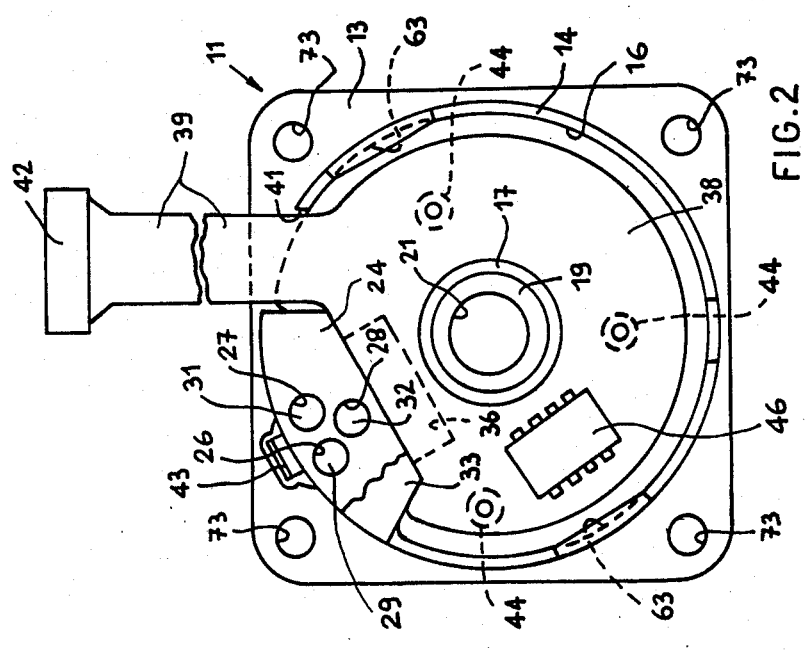
FIG. 2 is a front view of a first casing half of the transducer shown in FIG. 1.

The casing half 11 is of such a configuration as to have a substantially square front wall 13 (see FIGS. 1 and 2), from which projects a substantially cylindrical wall 14 which defines an internal cavity 16. Provided in a central region 17 of the front wall 13 is a seat 18 for a self-aligning bush 19 of known type, having a central hole 21 passing therethrough and a spherical outside surface 22. The central region 17 is externally provided with a reference surface 23.

The casing half 11, inside the cavity 16, is provided with a support 24 carrying three cylindrical seats 26, 27 and 28 where three corresponding phototransistors 29, 31 and 32 are housed. Fixed in front of the three phototransistors 29, 31 and 32 is a light collimation mask 33 comprising for example a metal plate having photoengraved openings 34. The mask 33 is substantially parallel to the external reference surface 23.

Provided on the wall 13, in line with the three phototransistors 29, 31 and 32 is an aperture 36 which can be closed by a rubber plug 37. A printed circuit 38 is also arranged within the cavity 16 in the casing half 11, and comprises a disc-shaped sheet of flexible plastics material of a thickness of a few tenths of a millimetre. The printed circuit 38 is connected to the phototransistors 29, 31 and 32 and is provided with a first, upper tongue 39 which is arranged to extend out of the casing 11 through an opening 41 to be connected to an external connector 42, and a second tongue 43 which is arranged to be inserted within the casing half 12. Three posts 44 which are disposed within the cavity 16 support and position the printed circuit 38 with respect to the casing half 11. Circuit components 46 of known type are mounted on the circuit 38.

Figure 3:
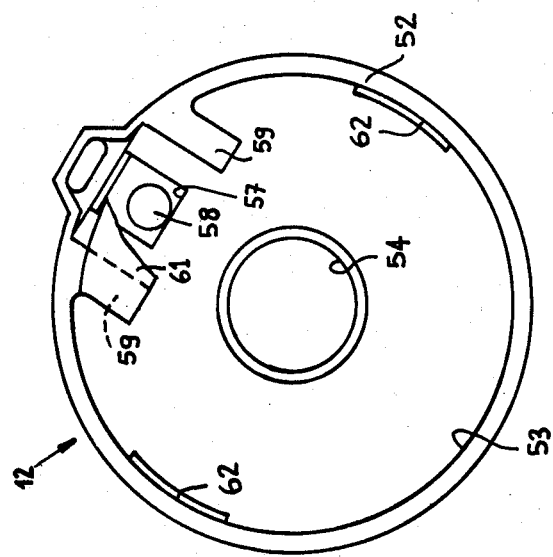
FIG. 3 is a front view of a second casing half of the transducer shown in FIG. 1.

The second casing half 12 (see FIGS. 1 and 3) is of such a configuration as to provide a front wall 51 and a side wall 52 which define a substantially cylindrical cavity 53. The wall 51 is provided with a central hole 54, which can be closed by means of a plug-in cap 56 of substantially cylindrical shape and made of plastics or rubber.

Provided on the wall 51 is a seat 57 within which is disposed a light emitting diode (LED) 58. Arranged in front of the LED 58 and supported by two projecting portions 59 is a light diffusing elements 61 formed for example by a plate of transparent plastics material. The diffuser 61 is substantially parallel to the mask 33, when the two casing halves 11 and 12 are fitted together, and provides that the beam of light emitted by the LED 58 is substantially perpendicular to the mask 33. The casing half 12 is provided with a pair of ribs 62 which are disposed within the side wall 52 and which are arranged to snap into latching engagement with corresponding grooves 63 which are provided on the cylindrical portion 14 of the casing half 11, thus to form the connection between the two casing halves 11 and 12.

The transducer 10 further comprises a shutter disc 64 which may be of metal or opaque plastics material, and is provided with a plurality of radial openings which are disposed on a circular ring coaxial with a central hole 67 and disposed in alignment with the phototransistors 29 and 31. A single opening 68 is provided in the disc 64 at a more inward location with respect to the openings 66, thereby to co-operate with the phototransistor 32. The radial openings 66 are angularly equally spaced from each other and the number thereof may vary between 100 and 500, depending on the type of use for which the transducer is intended. The openings 66 thus The transducer 10 as described hereinbefore can be connected to a rotary member for detecting the angular position thereof and generating corresponding electrical signals. By way of indication, in FIG. 1, the transducer 10 is shown coupled to a cylindrical shaft 71 of an electric motor 72. The shaft 71 is of the same diameter as the hold 21 in the bush 19 and the hole 67 in the shutter disc 64.

The casing half 11 is arranged to be fixed to the body of the motor 72, for example by means of screws (not shown) which can be fitted into holes 73 in the wall 13, in such a way that the front surface 23 is held against a corresponding reference wall portion 74 of the motor 72, which is orthogonal to the axis of rotation of the shaft 71.

A cylindrical spacer 76 is fitted coaxially to the shaft 71 to hold the shutter disc 64 at a predetermined axial spacing from the bush 19. A cylindrical sleeve 77 is fitted coaxially to the shaft 71 for locking the disc 64 with respect to the shaft 71, by means of a grub screw 78.

The operation of mounting the transducer 10 and connecting it to the shaft 71 are carried out in the following manner:

The two casing halves 11 and 12 are first prepared separately, with the casing half 11 accommodating the bush 19, the three phototransistors 29, 31 and 32, the mask 33 and the printed circuit 38, and the casing half 12 accommodating the LED 58 and the light diffuser 61.

The conductor wires of the phototransistors 29, 31 and 32 are soldered to the printed circuit 38 through the opening 36 in the wall 13 of the casing half 11, whereupon the opening 36 is closed by means of the plug 37 to prevent light and impurities from entering the interior of the transducer. When the casing half 11 has been prepared in that way, it is fitted on to the shaft 71. More particularly, the shaft 71 is precisely inserted into the hold 21 in the bush 19 which is self-adjusting in its seat 18. When the reference surface 23 of the casing half 11 is brought into contact with the wall 74 of the motor 72, the shaft 71 is disposed perpendicularly to the mask 33.

The casing half 11 is thus fixed to the motor 72. The spacer 76, the shutter disc 64 and the sleeve 77 and then fitted onto the shaft 71, and the arrangement is locked by means of the grub screw 78. In that way, the disc 64 is axilly positioned with respect to the mask 33 and is parallel thereto. Finally, the casing half 12 is fitted to the casing half 11 by means of the teeth 62 which are in latching engagement with the recesses 63. The projection portion 43 on the printed circuit 38 is then connected, for example by means of soldering, to the conductors of the LED 58. The shutter disc 64 is thus parallel to the light diffuser 61 and therefore perpendicular to the beam of light emitted by the LED 58.

The central hole 54 in the casing half 12 is closed by the cap 56 to prevent light and impurities from entering the interior of the transducer.

Before the two casing halves 11 and 12 are locked together, a check is carried out in regard to their mutual angular positioning. In accordance with a feature of the invention, that check is performed by detecting by means of an oscilloscope the two analog signals generated in response to the light detected by the photodetectors 29 and 31, and by rotating the casing half 12 with respect to the casing half 11 in the clockwise or anticlockwise direction, until the two analog signals are equal in amplitude, that is to say, until the LED 58 is correctly positioned with respect to the two corresponding phototransistors 29 and 31. That relative rotary movement as between the two casing halves 11 and 12 is possible because the length of the grooves 63 is greater than the length of the corresponding ribs 62. When this checking operation has been carried out, the two casing halves 11 and 12 are locked together in any known fashion, for example by means of an adhesive.

The mode of operation of the transducer 10 as described hereinbefore is conventional and will not be described herein for the sake of brevity.

Figure 4:
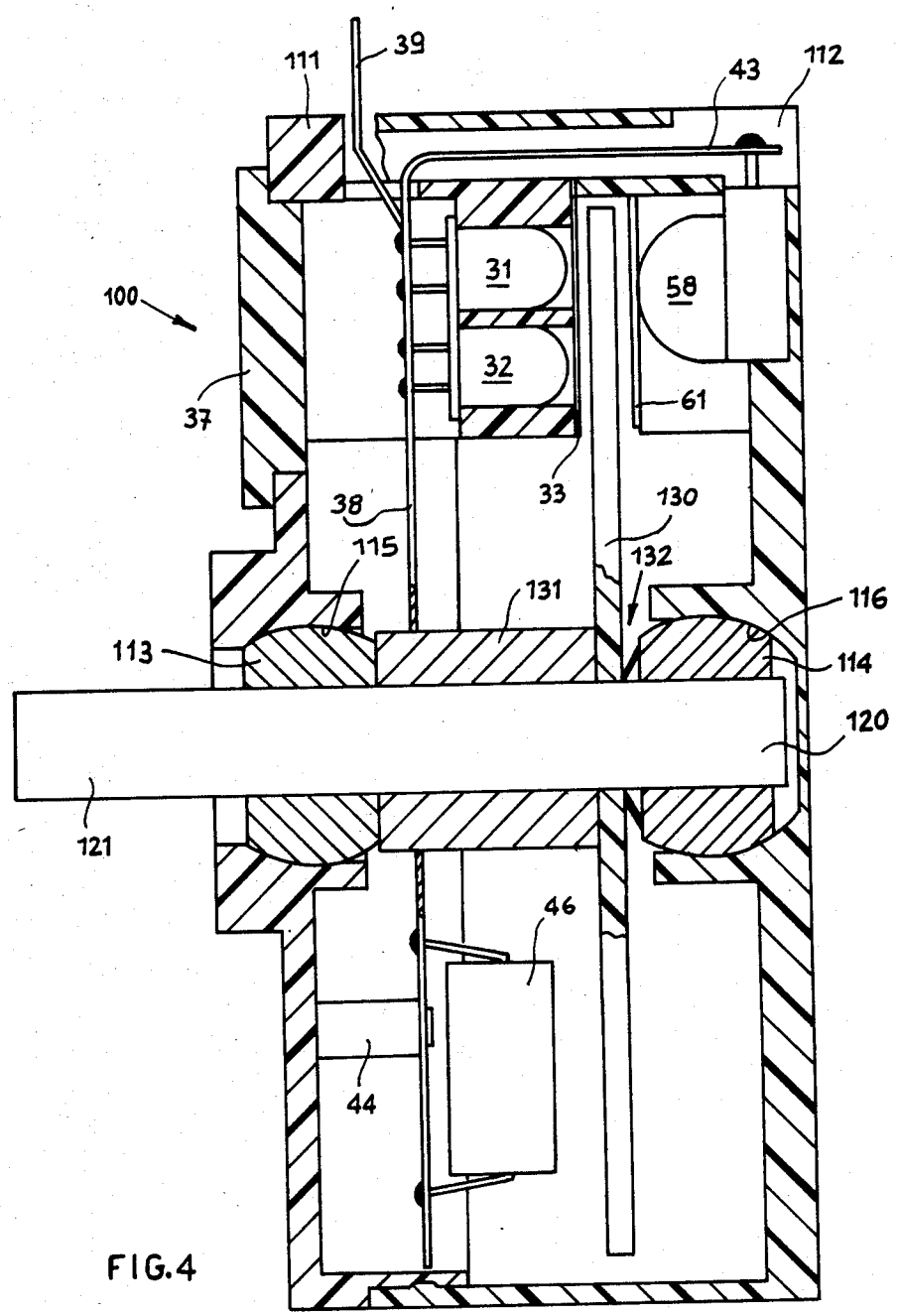
FIG. 4 is a sectional side view of a transducer according to the invention in a second embodiment.

In accordance with the second embodiment, shown in FIG. 4, an optical transducer 100 comprises a casing formed by two casing halves 111 and 112 which are capable of supporting a cylindrical shaft 120 by means of two self-aligning bushes 113 and 114 which are housed in seats 115 and 116 respectively. The cylindrical shaft 120 has an end portion 121 which projects out of the casing of the of an elastic coupling joint, to the rotary member whose angular position is to be detected.

The casing half 112 is identical to the casing half 12 and carries the same light detector and circuit elements as those used in the transducer of FIG. 1, so that the description thereof will now be repeated here.

As regards the optical portion, the casing half 113 is largely the same as the above-described casing half 13. A shutter disc 130 is free to rotate within the two casing halves, the shutter disc 130 being identical to the disc 64 and being mounted on the shaft 120 between the bushes 113 and 114 by means of a cylindrical spacer 131 and cup springs 132. The disc 130 is locked on the shaft 120 in any known manner during the operation of assembling the transducer.

It will be clearly apparent from the foregoing description that at least one self-aligning bush 19, 113 is mounted on one of the two casing halves 11, 111 of the transducer 10, 100, and that the bush co-operates with the rotary member 71, 120 to hold the shutter disc 64, 130 orthogonal with respect to the beam of light emitted by the light emitter 58.

What we claim is:

1. In an optical transducer connectable to a fixed body and a rotary member for detecting the angular position of the rotary member with respect to the fixed body and generatng corresponding electrical signals, comprising light emitter means for emitting a light beam having a predetermined axis, light detector means, a casing in which are mounted said light emitter means and said light detector means, first means actuatable for fixing a front portion of said casing to said fixed body, a shutter disc assembly connectable to said rotary member and provided with a hub engageable slidably with said rotary member and a fixing member operable from the outside of said casing for fixing said hub to said rotary member and wherein said shutter disc assembly includes a shutter disc having a plurality of transparent radial elements alternated with opaque radial elements capable of cooperating with said emitter means and said light detector means for generating said electrical signals, the combination comprising:

at least one self-aligning bush having an outer surface with a spherical portion, a rear surface, and an inner surface for cooperating rotatably with said rotary member;

at least a seat on the front portion of said casing having an inner surface cooperative with said spherical portion of the bush to enable adjustment of inclination of said rotary member with respect to the front portion of the casing; and a distantial member interposed between said bush and said shutter disc;

wherein a front portion of said distantial member is cooperative with the rear surface of said self-aligning bush upon the operation of the fixing member for the fixing of the hub of said shutter disc assembly to said rotary member for holding said shutter disc exactly interposed between said light detector means and said light emitter means and substantially orthogonal to the axis of the light beam emitted by said light emitter means.

2. An optical transducer according to claim 1, wherein said casing is formed by a first casing half in which said light emitter means is mounted and a second casing half including said front portion and in which said light detector means is mounted.

3. An optical transducer according to claim 1, wherein said casing is substantially closed, and wherein a flexible printed circuit is mounted within said casing and is connected to an external connector.

4. An optical transducer according to claim 2, wherein each one of said two casing halves comprises a front wall substantially parallel to said shutter disc and a peripheral wall which defines a cylindrical cavity, and wherein said seat is provided in a central region of the front wall of said second casing half.

5. An optical transducer according to claim 1, wherein said rotary member projects from a central through hole of a rear portion of said casing opposite to said front portion, wherein said shutter disc assembly comprises a sleeve having a portion projecting through said central hole and wherein said fixing member comprises a screw mounted on said projecting portion, further comprising a plug-in cap covering said projecting portion and engaged in said central through hole.

6. An optical transducer according to claim 1, wherein another self-aligning bush is mounted on said first casing half, also for co-operating with said rotary member.

7. An optical transducer according to claim 3, wherein said closed casing comprises a first casing half and a second casing half, and wherein said printed circuit is mounted on said second casing half and is provided with a second projecting portion extending into said first casing half for contacting said light emitter means.

8. An optical transducer according to claim 2, wherein said two casing halves are coupled together by means of ribs provided on one of saidcasing halves and making latching engagement with corresponding recesses provided on the other of said casing halves.

9. An optical transducer according to claim 8, wherein the angular magnitude of said recesses is greater than the angular magnitude of said ribs to permit relative rotational movement as between said first and second casing halves after they have been coupled together, prior to locking the two casing halves together in an angular position corresponding to a predetermined relative position as between said light detector means and said light emitter means.

10. An optical transducer according to claim 9, wherein said predetermined relative position is verified by means of an oscilloscope displaying the signals generated by said light detector means in response to said light beam emitted by said light emitter and to the rotary movement of said shutter disc.

11. In an optical transducer connectable to a rotary member for detecting the angular position thereof and generating corresponding electrical signals, comprising a substantially close casing in which a shutter disc, a light emitter means and at least one light detector means are mounted, wherein said light emitter means and said light detector means each have electric feeding leads and wherein said shutter disc is angularly fixed to said rotary member, the improvement wherein a flexible printed circuit is disposed within said casing and is connected to the leads of said light detector means of said light emitter means, wherein said flexible printed circuit comprises a main portion mounted inside said casing adjacent to the shutter disc to support electrical components and the leads of one of said light emitter means and light detecttor means, and a bent portion encompassing said shutter disc to connect the leads of the other of said light emitter means and light detector means and wherein said flexible printed circuit comprises an external portion which projects out of said casing to be connected to an external connector for electrical connection with said leads.

12. In an optical transducer connectable to a fixed body and a rotary member for detecting the angular position of said rotary member and generating electrical signals, comprising substantially closed casing formed by a first casing half in which a light emitter is mounted and a second casing half in which at least one light detector associated with said light emitter is mounted, a shutter disc connectable to said rotary disc and interposed between the light detector and the light emitter and fixing means actuatable for fixing a first of said casing half to said fixed body, the improvement wherein said two casing halves are held together by first coupling means on one of said casing halves and by second coupling means on the other of said casing halves, said first and second coupling means comprising a circular rib portion on one of said halves and complimentary circular seat on the other casing half concentric with said shaft and locking means actuatable for axially locking together said casing halves, wherein the circular rib and the circular seat of said coupling means have cooperative surfaces coaxial with said rotatable member for enabling relative retational movement as between the first and second casing halves after coupling thereof, prior to locking said two casing halves together in an angular position corresponding to a predetermined relative position as between said light detector and said light emitter and irrespectively of the actuation of said fixing means for the fixing of the first of said casing half to said fixed body.

13. In an optical transducer connectable to a fixed body and a rotary member for detecting the angular position of the rotary member with respect to the fixed body and generating corresponding electrical signals, comprising light emitter means for emitting a light beam having a predetermined axis, light detector means, a casing in which are mounted said light emitter means and said light detector means, fixing means actuatable for fixing said casing to said fixed body, and a shutter disc assembly provided with a shaft connectable with said rotary member and wherein said shutter disc assembly includes a shutter disc having a plurality of transparent radial elements alternated with opaque radial elements capable of cooperating with said emitter means and said light detector means for generating said electrical signals, the combination comprising

- a pair of self-aligning bushes each having an outer surface with a spherical portion, an internal edge, and an inner surface for cooperating rotatably with said shaft;
- a pair of seats on said casing each having an inner surface cooperative with the spherical portion of the outer surface of said pair of bushes, respectively;
- a distantial member interposed between one of said bushes and said shutter disc; and
- a spring member interposed between the internal edge of another of said bushes and said shutter assembly for urging said distantial member against the internal edge of the one of said bushes for holding said shutter disc exactly interposed between said light detector means and said light emitter means.

* * * * *